United States Patent

Ogaki et al.

Patent Number: 5,819,040
Date of Patent: Oct. 6, 1998

[54] IMAGE PROCESSING SYSTEM FOR TRANSFERRING ELECTRONIC DOCUMENT AND PAPER DOCUMENT AS SINGLE MAIL

[75] Inventors: Takeshi Ogaki, Tokyo; Yoshiko Takeda, Yokohama; Shiro Takagi, Tokyo; Akinori Iwase, Yokosuka, all of Japan

[73] Assignee: Kabushiki Kaisha Toshiba, Japan

[21] Appl. No.: 659,256

[22] Filed: Jun. 6, 1996

[30] Foreign Application Priority Data

Jun. 9, 1995 [JP] Japan ................................. 7-143131

[51] Int. Cl.$^6$ ........................................................ H04N 1/00
[52] U.S. Cl. .............................. 395/200.47; 395/200.3; 707/500; 707/514; 707/530
[58] Field of Search ......................... 395/200.47, 200.31; 707/500, 514, 515, 530, 541; 235/375, 432

[56] References Cited

U.S. PATENT DOCUMENTS

| | | | |
|---|---|---|---|
| 4,918,588 | 4/1990 | Barrett et al. | 364/200 |
| 5,040,142 | 8/1991 | Mori et al. | 364/900 |
| 5,109,439 | 4/1992 | Froessl | 382/61 |
| 5,191,525 | 3/1993 | LeBrun et al. | 364/419 |
| 5,282,052 | 1/1994 | Johnson et al. | 358/402 |
| 5,291,305 | 3/1994 | Sakashita et al. | 358/444 |
| 5,295,181 | 3/1994 | Kuo | 379/100 |
| 5,398,115 | 3/1995 | Lin | 358/407 |
| 5,444,840 | 8/1995 | Froessl | 395/145 |
| 5,485,368 | 1/1996 | Ogaki et al. | 364/191 |
| 5,486,686 | 1/1996 | Zdybel, Jr. et al. | 235/375 |
| 5,497,319 | 3/1996 | Chong et al. | 364/419.02 |
| 5,499,108 | 3/1996 | Cotte et al. | 358/400 |
| 5,513,013 | 4/1996 | Kuo | 358/448 |
| 5,557,515 | 9/1996 | Abbruzzese et al. | 364/401 R |
| 5,659,164 | 8/1997 | Schmid et al. | 235/375 |

FOREIGN PATENT DOCUMENTS

| | | |
|---|---|---|
| 0 532 796 A1 | 3/1993 | European Pat. Off. . |
| 0 541 262 A2 | 5/1993 | European Pat. Off. . |
| 6-276484 | 9/1994 | Japan .................. G06K 9/20 |
| 6-284144 | 10/1994 | Japan .................. H04L 12/54 |
| 7-36988 | 2/1995 | Japan .................. G06F 17/60 |

OTHER PUBLICATIONS

Liu et al., "Compound Document Transfer Between Electronic Mail Network and Facsimile Terminals", IEEE, 1990.

*Primary Examiner*—James P. Trammell
*Assistant Examiner*—Patrick Assouad
*Attorney, Agent, or Firm*—Limbach & Limbach L.L.P.

[57] ABSTRACT

An image processing system has a scanner for reading image information of a sheet, on which a first instruction for transferring image information of an electronic document and image information of a paper document to an arbitrary program at a first terminal as a single transferred document and a second instruction for starting an arbitrary second terminal for creating the electronic document, together with the image information of the paper document, a function for starting the program at the second terminal to create the image information of the electronic document on the basis of the second instruction, and a function for transferring the image information of the paper document and the image information of the electronic document as a single transferred document to the first terminal on the basis of the first instruction.

19 Claims, 8 Drawing Sheets

< DOCUMENT CIRCULATION >

| | |
|---|---|
| SENDER | [▼] |
| CIRCULATION DESTINATION | [▲▼]  [OPTION] |
| CASE NAME | |
| LETTER ON PAPER | ● ATTACHED   ○ NON-ATTACHED |

[FORM DOCUMENT]  [SELECT DOCUMENT]  [E N D]

FIG. 6

| SHEET ID | PROCESSING PROGRAM NAME |
|---|---|
| 51 | 50 / 52 |
| 012345 | DOCUMENT CIRCULATION |

SHEET MANAGEMENT TABLE

FIG. 7

| JOB ID | REQUESTER | REQUEST DATE | JOB STATUS | JOB DETAILED INFORMATION PRINTER |
|---|---|---|---|---|
| CIRCULATION [1] | 02468 | | | ADDRESS OF TABLE 80 (CIRCULATION) |
| DISTRIBUTION [2] | | | | |
| | | | | |

JOB MANAGEMENT TABLE

USER MANAGEMENT TABLE

| 71 USER ID | 70 / 72 PASSWORD | 73 TERMINAL ADDRESS |
|---|---|---|
|  |  |  |

FIG. 10

DIRCULATION MANAGEMENT TABLE

| 81 CIRCULATION ID | 82 RELATING FLAG | 80 / 83 TERMINAL ADDRESS | 84 IMAGE ID | 85 DOCUMENT ID | 86 SENDER | 87 DESTINATION | 88 OPTION |
|---|---|---|---|---|---|---|---|
| CIRCULATION [1] | ON |  |  |  |  |  |  |
|  |  |  |  |  |  |  |  |

IMAGE PROCESSING SYSTEM FOR TRANSFERRING ELECTRONIC DOCUMENT AND PAPER DOCUMENT AS SINGLE MAIL

BACKGROUND OF THE INVENTION

1. Field of the Invention

The present invention relates to a document transmitting apparatus for transmitting a paper document created with handwriting and an electronic document created with a personal computer being related with each other, and a document transmitting method.

2. Description of the Related Art

When a paper document created with handwriting is to be managed with a document transmitting apparatus, the paper document is usually loaded as image data using a scanner or the like to store the image data as an image file, and the image file is managed on the basis of its file name.

An electronic document created with a personal computer (terminal) can be transmitted to another personal computer or the like as mail using a mailing system.

However, when a paper document and an electronic document are to be transmitted to another personal computer or the like as mail constituted by a single document, temporary data management which is not directly related to mail transmission on a personal computer must be performed. More specifically, the following operation must be performed. That is, a paper document is read with a scanner and converted into a file of an electronic document, a file name is added to this file to designate it, and this file is combined to the above electronic file to be integrated. As described above, in order to transfer a paper document and an electronic document as electronic mail, a cumbersome data management process must be performed.

For example, in co-writing, when a plurality of persons concerned proofread one original, the original is often printed on paper and then additionally revised with handwriting on practical business to make it easy to check the entire original or to make it easy to understand additional revised portions. In this case, when the paper document which is additionally revised with handwriting is to be transmitted (circulated) by using electronic mail together with a comment (electrical text file) which is added to the paper document, a user must create a large number of image files and document files to process these files and be conscious of the file names thereof.

More specifically, even if a user instructs circulation using a sheet or instructs circulation by operating an application for mail for a personal computer, cumbersome operations must be performed.

SUMMARY OF THE INVENTION

It is an object of the present invention to provide a document transmitting apparatus in which a paper document created with handwriting and an electronic document created on a personal computer can be transmitted as one document with a simple operation without causing a user to move between the personal computer for processing the electronic document and a scanner for processing the paper document.

According to the present invention, there is provided an image processing system comprising: means for reading image information of a sheet having a first instruction for transferring information of an electronic document and image information of a paper document to an arbitrary first terminal as a single transferred document and a second instruction for starting an arbitrary program at a second terminal for creating the electronic document, together with the image information of the paper document; means for starting the program at the second terminal to create the information of the electronic document on the basis of the second instruction; and means for transferring the image information of the paper document and the information of the electronic document as a single transferred mail to the first terminal on the basis of the first instruction.

According to the present invention, there is provided an image processing system comprising: means for creating information of an electronic document to be transferred using a first terminal; means for inputting an instruction for transferring the information of the electronic document and image information of a paper document as a single transferred mail to an arbitrary terminal using the first terminal; means for printing a sheet on which the instruction is described; means for reading the sheet and the image information of the paper document; and means for transferring the image information of the paper document and the information of the electronic document as a single transferred mail to the second terminal on the basis of the instruction described on the sheet.

In the present invention, with the above arrangement, the image information of a paper document and the information of an electronic document can be circulated among a plurality of terminals as a single mail.

More specifically, in the prior art, in order to circulate the image information of the paper document and the information of the electronic document together as a single mail, an operator must perform the following process. That is, the paper document is read and then converted into an electronic document, and these electronic documents are combined into a single electronic document.

However, according to the former arrangement of the present invention, circulation of a single mail is performed using a sheet input method for reading an instruction sheet and a paper document from a scanner. More specifically, an instruction to circulate a paper document and an electronic document with a single mail and an instruction to designate one program at a terminal which is started to create the electronic document are handwritten on a sheet which is printed out in advance, and these documents are read by a scanner. In accordance with these instructions, the system of the present invention starts the designated terminal, and an operator performs key-inputting from the started terminal to create an electronic document. By using the created electronic document, the paper document read in accordance with the above instructions and the electronic document can be transferred as a single mail to a plurality of designated terminals.

Therefore, by using the step of reading a paper document and instruction sheet from the scanner without causing a user to move between a room in which a terminal is present and a room in which the scanner is present, and then inputting an electronic document from the terminal, circulation processing of a single mail can be performed.

In addition, according to the later structure of the present invention, by using a terminal input method in which an electronic document is created and an operation for instructing a paper document and the electronic document to be transferred with a single mail is performed from one terminal, circulation is performed with a single mail.

More specifically, an electronic document is created by a key operation from one terminal, an instruction that the image information of the electronic document and the paper document are transferred to an arbitrary terminal with a single mail is given by a key operation to the terminal. In addition, a printer prints an instruction sheet on which the given instruction is described. An operator gives the sheet on which a circulation instruction of the single mail is described and the paper document to be circulated to the scanner, and the server obtains the image information of the paper document through the scanner, and transfers the image information and the electronic document given by the terminal to the designated terminal as a single mail.

In this manner, a conventional process of refiling a paper document as an electronic document need not be performed, and a user need not travel between a room in which a terminal is present and a room in which a scanner is present. Therefore, the image information of the electronic document and the paper document can be smoothly circulated as a single mail.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 6 is a view showing a displayed operation screen;

FIG. 7 is a view showing an arrangement of a sheet management table;

FIG. 8 is a view showing an arrangement of the sheet management table:

FIG. 9 is a view showing an arrangement of a user management table;

FIG. 10 is a view showing an arrangement of a circulation management table;

DETAILED DESCRIPTION OF THE PREFERRED EMBODIMENTS

The first and second embodiments of the present invention will be described below with reference to the accompanying drawings.

Figure 2A:
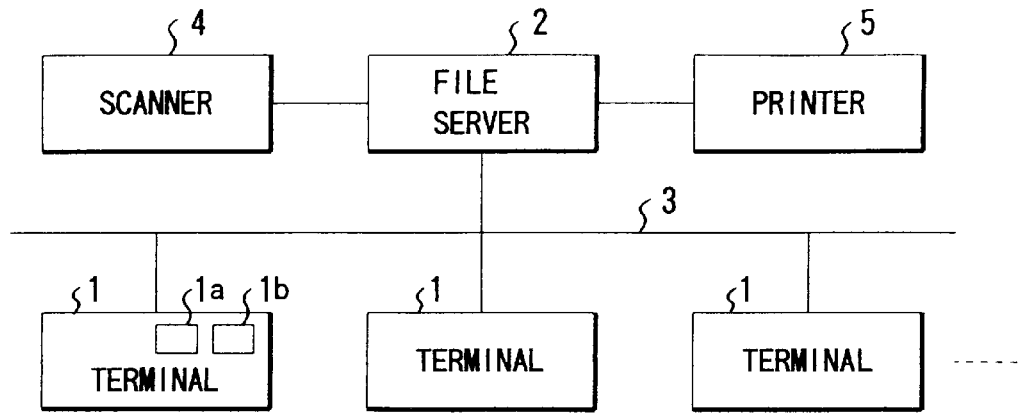
FIGS. 2A and 2B are views showing the schematic arrangement of a document circulation system according to the first to sixth embodiments of the present invention.
Figure 2B:
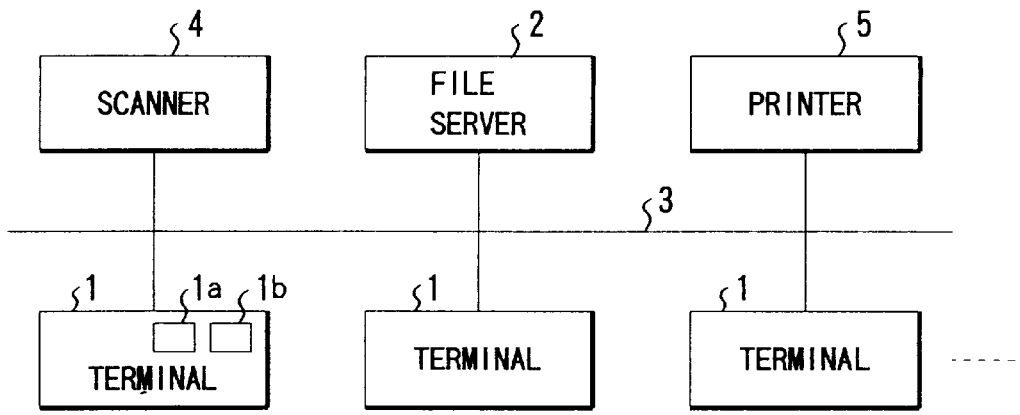

FIGS. 2A and 2B show arrangements of a document circulation system according to an embodiment of the present invention. More specifically, the document circulation system has a file server 2 serving as a document transmission apparatus, and a plurality of terminals 1 for an instruction operation or document formation are connected to the file server 2 through a network 3. A scanner 4 for reading a document circulation sheet (duty instruction sheet or transmission instruction sheet) for instructing document transmission and an image to be circulated and a printer 5 for printing the sheet or image are connected to the file server 2.

Alternatively, as shown in FIG. 2B, the scanner 4 and the printer 5 may be connected to the terminals 1 through the network 3.

Each terminal 1 is constituted by a machine such as a personal computer having a word processor function, an editing function, a graphic creating tool, or the like. The terminal 1 is constituted by a keyboard 1a serving as an input means, a display 1b serving as a display means, a controller, a transmission controller, and the like.

The file server 2 performs image management, document management, and document circulation control.

A plurality of terminals 1 are connected in accordance with the number of users. When the file server 2, the scanner 4, and the printer 5 are shared by all users, each of them may be connected to the terminals. However, a plurality of components may be connected to the terminals if the components can be identified from each other.

Figure 3:
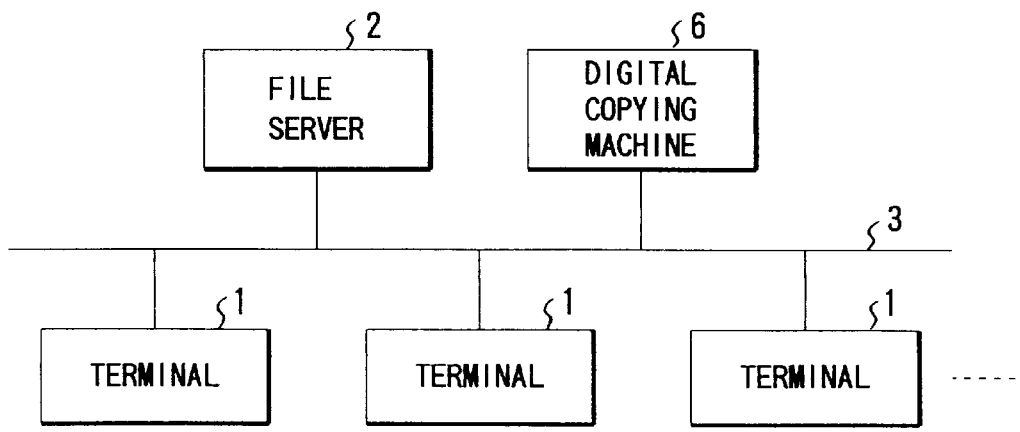
FIG. 3 is a view showing the schematic arrangement of a document circulation system according to the seventh and eighth embodiment.

In place of the scanner 4 and the printer 5, as shown in FIG. 3, a digital copying machine 6 constituted by a scanner section and a printer section may be connected to the terminals 1 through the network 3.

Figure 1:
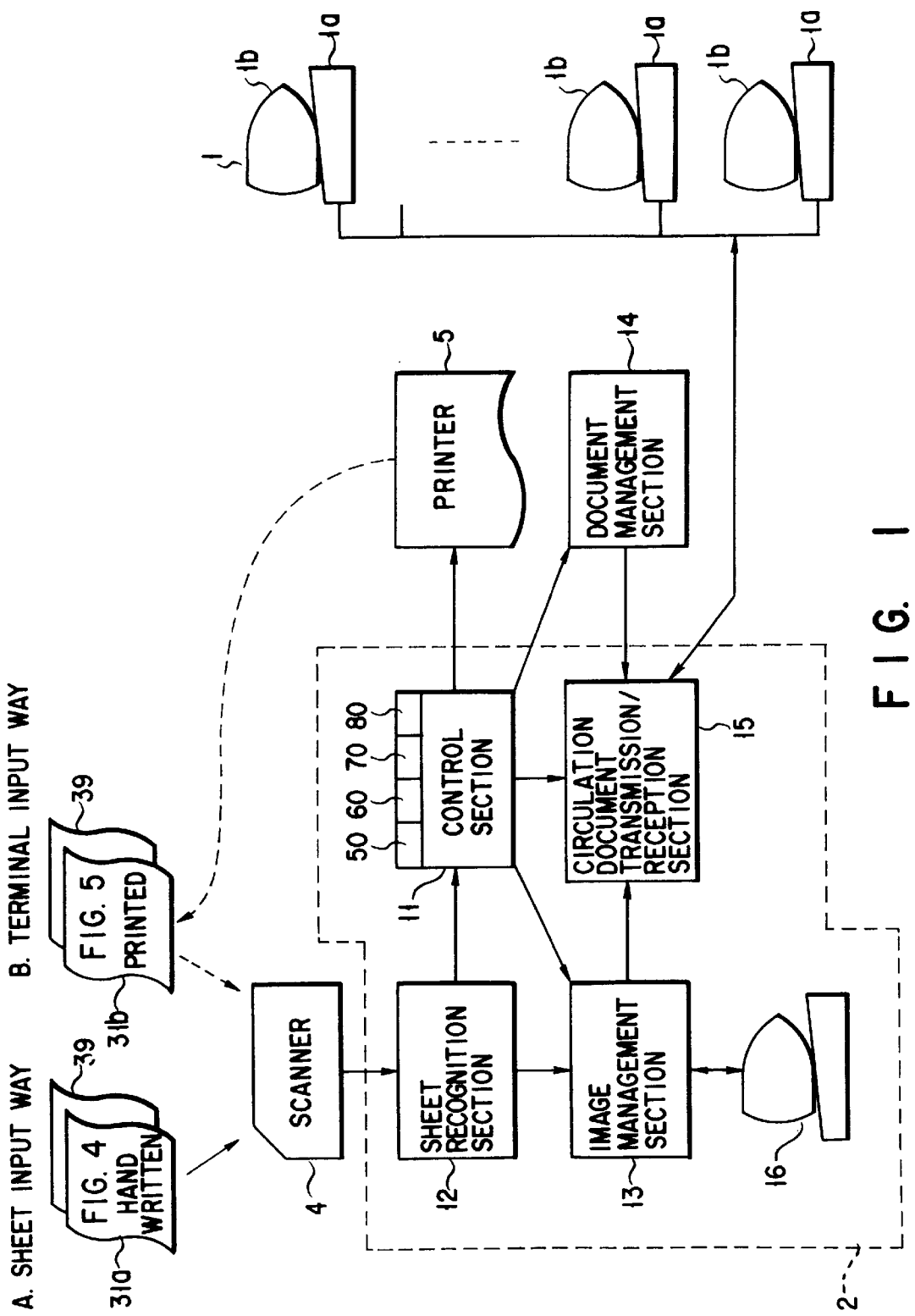
FIG. 1 is a view showing the system structure of a file server in a document circulation system for explaining embodiments of the present invention.

The system structure of the file server 2, as shown in FIG. 1, is constituted by a control section 11 for controlling the sections in the file server 2, a sheet recognizing section 12, an image management section 13, a document management section 14, a circulation document transmitting/receiving section 15, and a keyboard and display 16.

The sheet recognizing section 12 recognizes whether a sheet read by the scanner 4 is a document circulation sheet for instructing document circulation. If the sheet recognizing section 12 recognizes the sheet as a document circulation sheet, the sheet recognizing section 12 recognizes instruction contents (sender name, circulation path, circulation document name, and the like) related to the document circulation and written on the document circulation sheet. As information in a region to be recognized on the document circulation sheet, information is stored in the sheet recognizing section 12 in advance during design of the document circulation sheet and related to the means of a position, a size, and a parameter.

When the scanner 4 is the scanner section of the digital copying machine, the sheet recognizing section 12 may be arranged in the digital copying machine 6.

The image management section 13 stores image data read by the scanner 4 after the document circulation sheet is read to issue an image ID (identification number) for searching the image data. The image management section 13 provides an image specified by the image ID in transmission of a circulation document to the circulation document transmitting/receiving section 15.

The document management section 14 stores document data input and created by the terminal 1 to issue a document ID (identification number) for searching the document data. The document management section 14 provides a document specified by the document ID in transmission of a circulation document to the circulation document transmitting/receiving section 15.

The circulation document transmitting/receiving section 15 executes a transmission process for circulating an image and a document designated by the control section 11 according to a designated circulation path.

Figure 4:
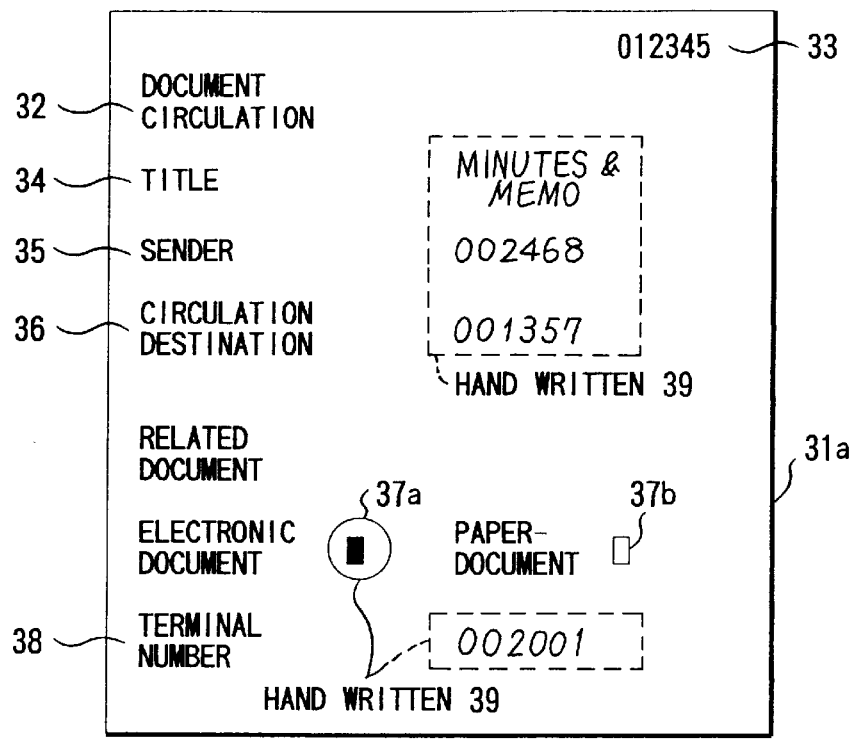
FIG. 4 is a view illustrating a document circulation sheet created with handwriting.
Figure 5:
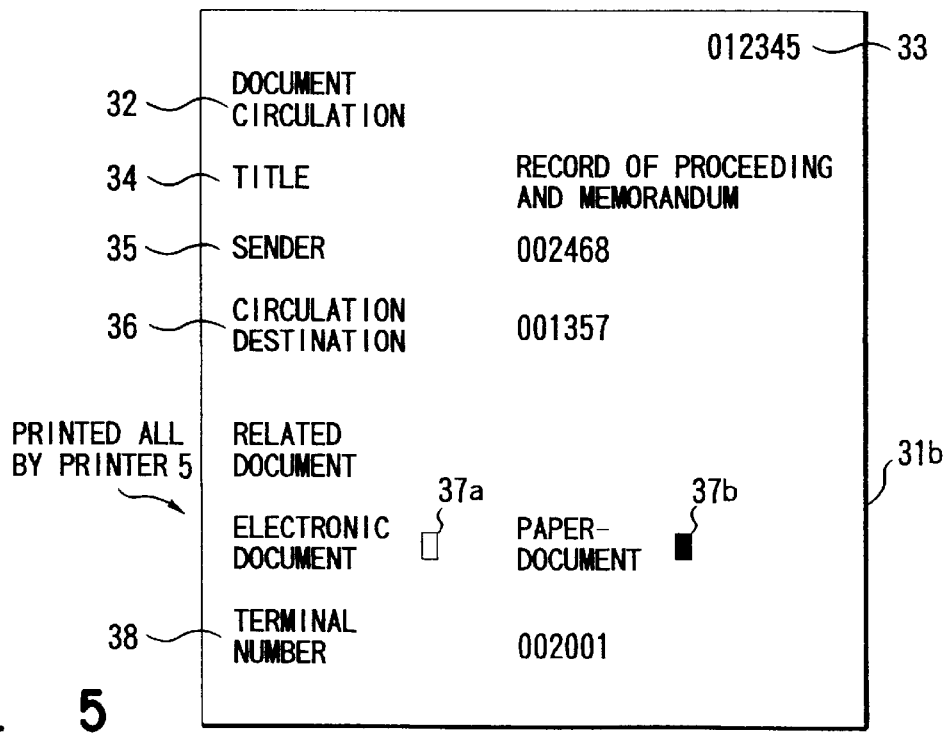
FIG. 5 is a view illustrating a document circulation sheet which is printed.

FIG. 4 shows a document circulation sheet (printed and handwritten) when (A) sheet input way is used, and FIG. 5 shows a document circulation sheet (entirely printed) when (B) terminal input way is used.

In the document transmission apparatus of the present invention, as a way of giving an instruction for electronically mailing a paper document and an electronic document as a single mail, two ways, i.e., (A) sheet input way serving as the first embodiment and (B) terminal input way are shown.

In the (A) sheet input way serving as the first embodiment, a printed sheet 31a is prepared, a title, a sender number, a circulation destination number, and a terminal number are handwritten in blanks of the sheet, and the handwriting 39 is read from the scanner 4 together with a document 39 to be circulated. More specifically, in this way, the necessary information (title of circulation, sender number of circulation, circulation destination number, terminal number of source transmitting circulation) which must be made clear when instruction of circulation is given is supplied to the file server 2 by the sheet 31a created by handwritten letters through the scanner 4.

The way will be described below in detail. The document circulation sheet 31a, as shown in FIG. 4, has regions such as a title (reference number) 32 representing the object of the document circulation sheet, an identification number 33 of the document circulation sheet, a circulation document name 34 designated by a user, a circulation document sender 35, a plurality of destinations 36 representing a circulation path, marks 37a and 37b for instructing the relationship between this document and another document, and a terminal number 38 for specifying a machine for inputting a document to be related. When the mark 37a is painted over, the mark 37a indicates the relation to an electronic document. When the mark 37b is painted over, the mark 37b indicates the relation to a paper document. As the circulation document sender 35, a specific terminal is set in advance.

When document circulation is instructed using the document circulation sheet 31, as shown in FIG. 4, the document circulation sheet 31 in which a user handwrites necessary items may be added to the start of the paper document to be input from the scanner 4.

When the paper document which is read by the scanner 4 together with the document circulation sheet 31 and another electronic document are to be circulated and transmitted to be related to each other, the mark 37a is painted over.

In this case, an electronic document to be related and a message for urging a user to input an electronic document to be related, a text, and a comment is displayed on the display of the terminal 1 ordinally registered in correspondence with the user.

The user need only input the text and comment from the keyboard 1a of the terminal 1.

The (B) terminal input way serving as the second embodiment is a way of giving this information from one terminal 1 to the file server 2. More specifically, necessary information is input from the keyboard of one terminal 1, and a document circulation sheet 31b in which the information is written is printed out from the printer 5. The sheet 31b is given to the file server 2 through the scanner 4 together with the document 39 to be circulated. Therefore, in this way, information is not handwritten on the sheet.

More specifically, when document circulation is interactively instructed by using the terminal 1, a circulation document name, a circulation document sender, a plurality of destinations representing a circulation path, and the like are input from the keyboard 1a of the terminal 1. In addition, a document (original, comment, or the like) to be circulated can be arbitrarily created by using various tools. For example, an operation screen shown in FIG. 6 can be used. In this operation screen, a sender, a circulation destination, a case name, and attached/non-attached of letter of paper are displayed, and the icons of document formation, document selection, and end are displayed.

When an electronically created document and a paper document are to be circulated and transmitted to be related to each other, this is instructed and operated by the keyboard 1a of the terminal 1. In this case, as shown in FIG. 5, the document circulation sheet 31 related to the document and shown in FIG. 5 is printed out from the printer 5. Contents input from the keyboard 1a of the terminal 1 are printed on the document circulation sheet 31 as necessary items. In this case, the mark 37b is painted over.

The user need only add the printed document circulation sheet 31 to the paper document to be related to cause the scanner 4 to read the document circulation sheet 31.

The structure of a system management table will be described below.

FIG. 7 is a view showing an arrangement of the sheet management table. FIG. 8 is a view showing an arrangement of a job management table. FIG. 9 is a view showing an arrangement of a user management table. FIG. 10 is a view showing an arrangement of a circulation management table.

The management tables are arranged in, e.g., the control section 11, and constituted by a sheet management table 50, a job management table 60, a user management table 70, and a circulation management table 80.

The sheet management table 50, as shown in FIG. 7, is constituted by the fields of a sheet ID 51 of a document circulation sheet and a processing program name 52 corresponding to the sheet ID. For example, "document circulation" is stored as a processing program name for a sheet ID "012345".

The job management table 60, as shown in FIG. 8, is constituted by the fields of a job ID 61 allocated to identify a started processing program, a job requester 62 corresponding to the job ID, a job request date (e.g., date input by the scanner 4) 63, a job status (waiting for transmission or during transmission) 64, and a job detailed information pointer (in case of circulation, address of the user management table 70) 65.

When the processing program is started, these values are set in the job management table 60.

The user management table 70, as shown in FIG. 9, is constituted by the fields of a user ID (corresponding to sender ID) 71, a password 72 corresponding to the user ID, and a terminal address (the terminal address used by the user is set) 73.

The circulation management table 80, as shown in FIG. 10, is constituted by the fields of a circulation ID (in case of circulation, the circulation ID is identical to the job ID of the job management table 60) 81, a relating flag 82 corresponding to the circulation ID, a terminal address 83, an image ID 84, a document ID 85, a sender 86, a destination 87, and an option (selection of a reply to confirm that the document arrives at a destination, a confidential document, and the like) 88. The contents written in the sheet and recognized are stored in a corresponding field to be managed.

In the above arrangement, an operation of the first and second embodiments of the present invention will be described below.

Figure 11:
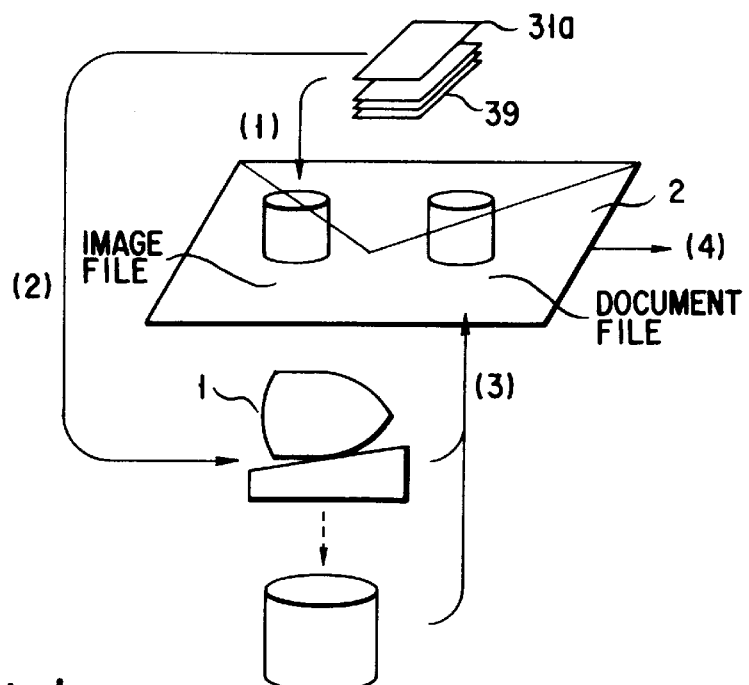
FIG. 11 is a concept view showing the flow of processing performed by a sheet input way according to the first embodiment.
Figure 12:
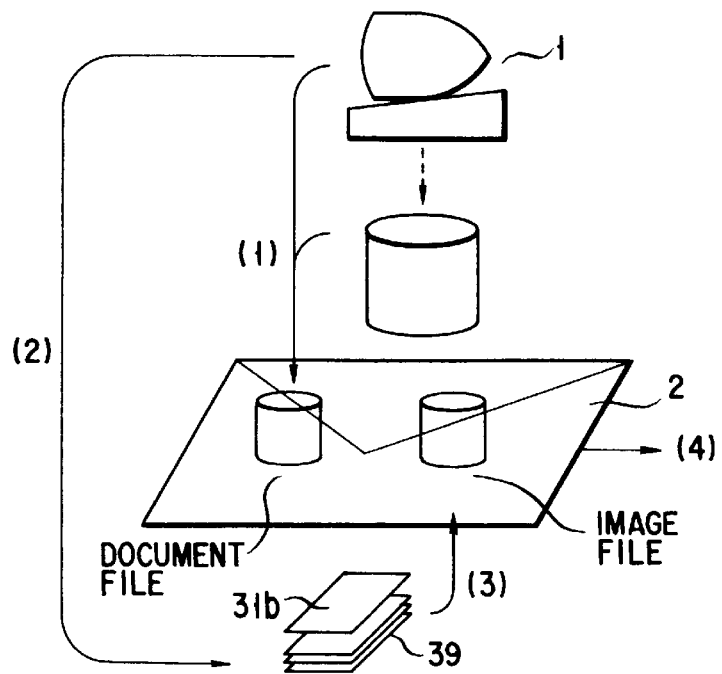
FIG. 12 is a concept view showing the flow of processing performed by a terminal input way according to the second embodiment.
Figure 13:
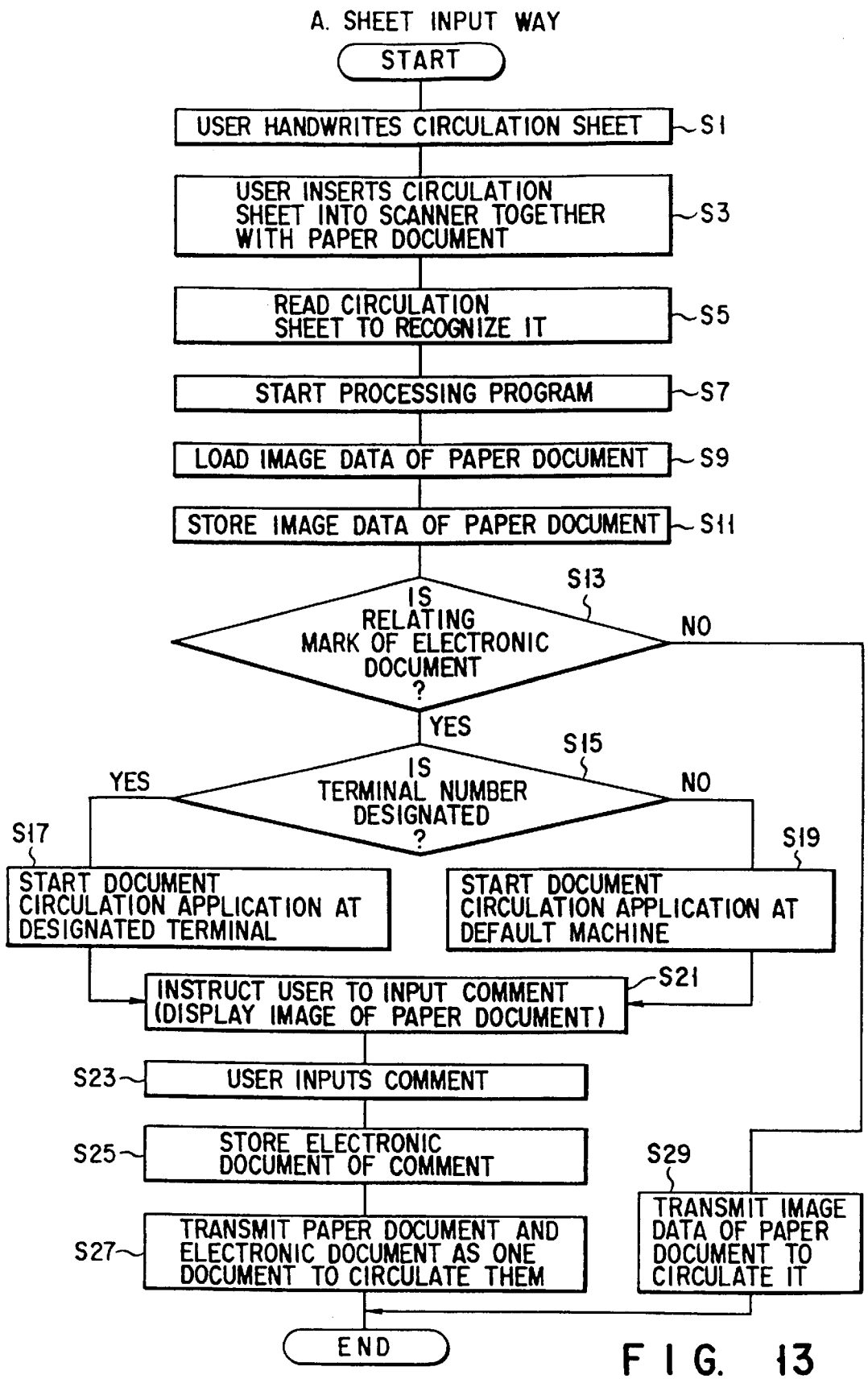
FIG. 13 is a flowchart for explaining an operation performed by the sheet input way according to the first embodiment.
Figure 14:
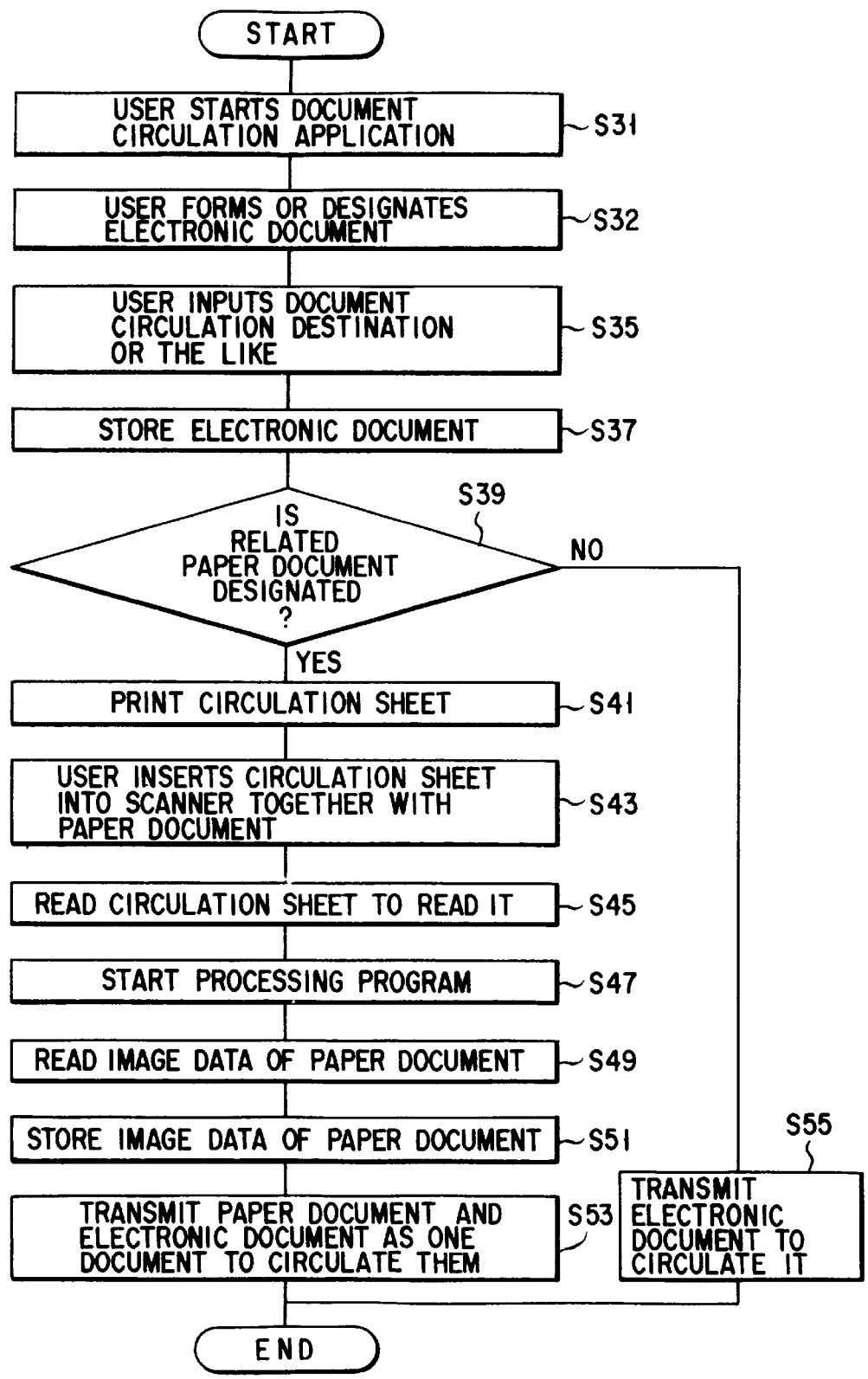
FIG. 14 is a flowchart for explaining an operation performed by the terminal input way according to the second embodiment.

FIG. 11 is a concept view showing the flow of processing performed by a sheet input way according to the first embodiment; FIG. 12 is a concept view showing the flow of processing performed by a terminal input way according to the second embodiment; FIG. 13 is a flowchart for explaining an operation performed by the sheet input way according to the first embodiment; and FIG. 14 is a flowchart for explaining an operation performed by the terminal input way according to the second embodiment.

A case wherein a document is co-written is considered.

(A) A case wherein circulation instruction is performed by the (A) sheet input way serving as the first embodiment, i.e., a case wherein a comment is to be added using an electronic document when a paper document is circulated using the document circulation sheet 31a, will be described below with reference to the flow of processing shown in FIG. 11 and the flowchart shown in FIG. 13.

When a person (operator) who creates an original with handwriting requests a plurality of persons to proofread it, the operator handwrites a document name or a request case name, the user ID of the operator who is a sender, and a destination (user ID or unique user name) of the persons who are requested to proofread in the document circulation sheet 31a (S1). The operator adds the document circulation sheet 31a to an original 39 to be proofread and inputs them from the scanner 4 (S3).

At this time, in addition to the original to be proofread, a comment representing that the original must be rapidly proofread or a comment representing that the original has a term is to be added. In this case, the above comment may be handwritten at the start of the original. However, in order to avoid an excessive description for the original, another comment may be electronically added to the original, and a text file which has been created may be added to the original.

In such a case, the user need only paint over the electronic document relating mark 37a on the document circulation sheet 31 (S1) to input the comment or the text file from the scanner 4.

The sheet image of the document circulation sheet 31 read by the scanner 4 is recognized and processed by the sheet recognizing section 12 (S5), and a "document circulation" processing program corresponding to a sheet ID "012345" obtained as a recognition result is started (S7).

At this time, the sheet management table 50 is referred to.

In this processing program of "document circulation", a control procedure for sequentially transmitting and processing a designated document through a designated path is provided to the document management section 14.

The started processing program of "document circulation" is managed by the job management table 60. When the processing program is started, these values are set in the job management table 60.

The type of a job corresponds to the type of a sheet which is designed in advance, and is not limited to "document circulation". If the type of a job is limited to "document circulation" as in this embodiment, on a circulation path on which circulation/transmission is frequently performed can be used such that a single-purpose sheet for specifying the circulation path is prepared.

In "document circulation" of this embodiment, a sheet recognition result is managed by the circulation management table 80. A pointer to the circulation management table 80 is set in the job detailed information pointer 65 of the job management table 60.

When the sheet recognizing section 12 determines that the electronic document relating mark 37a on the document circulation sheet 31 is painted over, ON is recorded on the relating flag 82 of the circulation management table 80. When the sheet recognizing section 12 determines that the electronic document relating mark 37a is not painted over, OFF is recorded on the relating flag 82 of the circulation management table 80.

When the sheet recognizing section 12 recognizes that "designated" is written in the field of the terminal number 38 on the document circulation sheet 31, a machine address corresponding to a machine name serving as a recognition result is stored at the terminal address 83 of the circulation management table 80. The relationship between the machine name and the machine address is also managed by a management table (not shown).

When the sheet recognizing section 12 recognizes that "non-designated" is written in the field, NULL is stored at the terminal address 83 of the circulation management table 80.

The scanner 4 reads the image data of a document which is set after the document circulation sheet 31 (S9), the image data is stored in the image management section 13 (S11), and an image ID allocated by the image management section 13 to identify the image data. The obtained image ID is stored in and managed by the image ID 84 of the circulation management table 80. At this time, (−1) is stored in the document ID 85.

It is checked whether the document relating flag 82 is in an ON or OFF state (S13).

When the relating flag 82 is in an OFF state, a document relating process which is a characteristic feature of the present invention and in which an electronic document and a paper document are transferred as a single mail need not be performed. Therefore, by using only image data obtained by reading the paper document from the scanner 4 as a target, the circulation document transmitting/receiving means 15 is operated in accordance with a path managed by the circulation management table 80 to execute circulation/transmission (S29).

When the relating flag 82 is in an ON state, it is checked with reference to the terminal address 83 of the circulation management table 80 whether a terminal address is designated (S15).

When the terminal address is designated, the document circulation application of the terminal 1 specified by the terminal address 83 is started (S17).

When the terminal address is not designated, the document circulation application of the terminal 1 serving as a default machine which is occupationally or preferentially permitted to be used by the sender 86 (S19).

The started document circulation application (if instructed, the image data of the paper document which is read from the scanner 4 in advance is displayed) urges the user to input (formation of electronic document) a comment to be circulated to be related to the document circulation application (S21, S23).

In this manner, the user can input the comment while confirming the image of the paper document read from the scanner 4 in advance.

A default machine for each user is also managed by a management table (not shown).

The user need only input a comment to be circulated together with the paper document read from the scanner 4 in advance as a single document. The user need not be conscious of the number of circulation, the number of the document, a file name, and the like.

The input electronic document (constituted by a code data) is returned to and stored in the document management section 14, and a document ID allocated by the document management section 14 to identify the document is stored and managed by the document ID 85 of the circulation management table 80 (S25).

As a result, preparation for relating the document and circulation/transmission is completed.

According to the contents of the circulation management table 80, the image data of the electronic document identified by the image ID 84 and the document data identified by the document ID 85 are circulated and transmitted as a single mail (S27). A circulation ID allocated to identify the mail is written in the field of the circulation ID 81 of the circulation management table 80 to be managed.

(B) A case wherein circulation instruction is performed by the (B) terminal input way serving as the second embodiment, i.e., a case wherein a handwritten memorandum is to be added when the document circulation application is operated to circulate an electronic document, will be described below with reference to the flow of processing shown in FIG. 12 and the flowchart shown in FIG. 14, i.e., when the document circulation application is operated to circulate an electronic document.

When a person who electronically creates an original using a wordprocessor function on the terminal 1 requests a plurality of persons to proofread the original, the document circulation application is started (S31) to input a document name or a requester name, the user ID of the sender, and the destination (user ID or unique user name) of the persons who are requested to proofread, and the created electronic document need be only designated (S33, S35).

At this time, a handwritten memorandum or a reference distributed with paper which are additionally stored by the user are often to be added and circulated with reference to the record of a design stage of an original. In this case, an instruction operation may be performed such that the paper document is related to the original.

In this case, since the "document circulation application" is started, the job ID 61, the job requester 62, a job request date 63, and the job status 64 which are allocated to identify the started processing program are stored in the job management table 60 to be managed.

The detailed information of document circulation is managed by the circulation management table 80, and a point to the circulation management table 80 is set in the job detailed information pointer 65 of the job management table 60. In the circulation management table 80, contents input for "document circulation application" are stored in the fields of the corresponding sender 86, destination 87, and option 88 to be managed.

If an operation for instructing relating of a paper document is performed, ON is recorded on the relating flag 82.

If no operation for instructing relating of a paper document is performed, OFF is recorded on the relating flag 82.

Since the terminal address 83 is not used, NULL is set at the terminal address 83.

At this time, (−1) is stored in the image ID 84.

When the electronic document which has been created on the terminal 1 is stored in the document management section 14 (S37), a document ID issued by the document management section 14 to identify the electronic document is directly stored in the document ID 85.

It is checked whether the document relating flag 82 is turned on (S39).

When the relating flag 82 is in an OFF state, circulation/transmission is executed because a document relating process is not necessary (S55).

When the relating flag 82 is an ON state, a command flows from the control section 11 to the printer 5, and the document circulation sheet 31 is printed and output (S41). This document circulation sheet 31 is a paper document relating sheet used when a paper document is added to a document to be circulated which has been designated by the "document circulation application" operation.

The document circulation sheet 31 which is printed and output is a document circulation sheet 31 which has been designated by the "document circulation application" operation and on which contents managed by the circulation management table 80 are printed. (If the scanner 4 is arranged near the printer 5, or if the digital copying machine 6 can be used, when the electronic document which has been input and created is developed into image data to be printed and output, the paper document can be read while confirming the contents of the electronic document to be related).

The user need only add the document circulation sheet 31 to the paper document to be added and causes the scanner to input the document circulation sheet 31 (S43). Sheet reading by the scanner 4 and sheet recognition by the sheet recognizing section 12 are executed (S45), and a "document circulation" processing program corresponding to the sheet ID "012345" is started (S47).

The sheet recognizing section 12 recognizes that the "paper document" of the document relating mark of the document circulation sheet 31 is significant to know that the electronic document and the paper document must be related to each other.

The scanner 4 reads image data set after the document circulation sheet 31 (S49), stores the image data in the image management section 13 (S51), and obtains an image ID allocated by the image management section 13 to identify the image data. The obtained image ID is stored in the terminal address 83 of the circulation management table 80 to be managed.

As a result, preparation for relating of the document and circulation/transmission is completed.

According to the contents of the circulation management table 80, image data identified by the image ID 84 and document data identified by the document ID 85 are circulated and transmitted as a single mail (S53).

The third and fourth embodiments of the present invention will be described below.

As described to some extent in the above embodiments, the image data of a paper document which has been read in (A) and electronic document data which has been input and created in (B) can be confirmed when related documents are given to the image data and the electronic document data.

More specifically, as the third embodiment, in (A), after instruction of circulation and reading of an image are executed using a sheet, when a comment is input on a personal computer side, at the same time, the image of the corresponding paper document can be displayed to be confirmed. As the fourth embodiment, in (B), after instruction of circulation from a personal computer and input and formation of an electronic document reading of an image are executed, when a paper document is read from a scanner, the contents of the corresponding electronic document can be developed as an image and printed on paper by a printer to be confirmed (however, when a digital copying machine can be used).

The fifth and sixth embodiments of the present invention will be described below. That is, as a modification of the present invention, a timing at which circulation/transmission of image data is executed can be changed.

More specifically, in (A) as the fifth embodiment, after a sheet is recognized, when a paper document is stored, circulation/transmission is executed. In (B) as the sixth embodiment, when the electronic document is stored in a document management section 14, circulation/transmission is executed. However, in this case, the image management section 13 has an image ID reserve/issue function and an image distribution function, and the document management section 14 has a document ID reserve/issue function and a document distribution function.

In (A) as the fifth embodiment, when a paper document is stored in the image management section 13, the control section 11 requests the document management section 14 to reserve/issue a document ID and stores the obtained document ID in a circulation management table 70, and, immediately, a document having image data and a document ID as contents are circulated and transmitted. When the circulation document is opened, a terminal 1 transmits the document ID to the document management section 14 to require document data and obtains document data by using the document distribution function.

In this manner, only a comment (and image ID) which is an electronic document is actually transmitted, and a handwritten memorandum serving as a paper document is stored in the image management section 13. In this case, when the terminal 1 requires the document data, the handwritten memorandum can be transferred for the first time. Therefore, a load on the terminal 1 and a load on a network can be reduced.

In (B) as the sixth embodiment, when an electronic document is stored in the document management section 14, the control section 11 requests the image management section 13 to reserve/issue an image ID and stores the obtained document ID in a circulation management table 70, and, immediately, a document having document data and an image ID as contents are circulated and transmitted. When the circulation document is opened, a terminal 1 transmits the document ID to image management section 13 to require document data and obtains image data by using the image distribution function.

In this manner, only a handwritten memorandum (and document ID) which is a paper document is actually transmitted, and complex graphic data serving as an electronic document is revised for a longer period of time and then stored in the document management section 14. The handwritten memorandum and the complex graphic data can be managed as a single circulation document. Since generation of circulation can be immediately executed, and graphic data is delayed, a sender can improve the degree of completion of the circulation. A receiver can omit a cumbersome operation in which a related single document is received as two mails and related to each other by the receiver.

As the seventh embodiment, even if a sheet is not used, when an apparatus in which a digital copying machine 6 as shown in FIG. 3 obtained by combining an image reading means and an input means to each other is used, the same effect as described above can be realized.

More specifically, as the seventh embodiment, a user instructs a control panel of the digital copying machine 6 to relate an electronic document, inputs a user ID and a circulation distinction, and reads a paper document. The user adds a comment while confirming an image by the terminal of the user to execute circulation/transmission.

In this case, the control section 11 records the input user ID and an image ID obtained by storing and managing image data by the image management section 13 in a user management table 70. The flowchart following this is performed such that a document management application is started by a default terminal (S21), an electronic document is stored (S25), and a paper document and the electronic document are circulated and transmitted as a single document (S27) in the same manner as described above.

As has been described above, according to the present invention, an instruction mark for relating an electronic document is created on a document circulation sheet, the electronic document is related to a paper document in accordance with a recognition result of the mark, thereby making it possible to circulate the electronic document and the paper document as a single mail.

More specifically, as the first embodiment of the present invention, circulation is instructed such that a paper document is input from a scanner or a digital copying machine using a document circulation sheet. In this case, only when an electronic document relating mark is painted over, the paper document is related to an electronic document input from another personal computer, and these documents are circulated as a single document (embodiment of A).

As the third embodiment, a comment serving as an electronic document can be additionally recorded while the image of an input paper document is confirmed by the display of a personal computer on the personal computer side (terminal side). At this time, the user need not be conscious of a circulation number, the electronic document and the paper document are automatically related to each other by additionally recording only the comment. When an arbitrary personal computer (terminal) near the scanner but a predetermined personal computer (terminal) can be designated by describing a terminal number on a document circulation sheet.

In the second embodiment of the present invention, a paper document relating instruction sheet is issued by an electronic document circulation application of the terminal, and a paper document which is input by a scanner together with this sheet is automatically related to an electronic document to be circulated (embodiment B).

More specifically, when the paper document relating sheet is issued in a state in which a circulation path and an option designated by the electronic document circulation application have been described on the sheet, and the user only inputs the sheet and the paper document by the scanner, relating and circulation/transmission are automatically executed. In this case, even if the same image is transmitted to a plurality of destinations, circulation can be performed by reading the image once.

According to the fifth and sixth embodiments, immediate circulation in which circulation can be started by only one of an electronic document and a paper document and delay circulation in which circulation is started by both an electronic document and a paper document can be instructed.

According to the seventh embodiment, the same effect as that in the first embodiment can be obtained by using a digital copying machine. More specifically, a user ID and a paper document are input from a digital copying machine in advance, and the user can execute comment addition and circulation/transmission while confirming an input image with the personal computer of the user. In the eighth embodiment, a user ID, a paper document, and a circulation path are input from a digital copying machine, and a user can execute comment addition and circulation/transmission while confirming an input image with the personal computer of the user. Therefore, the same process as that in the first and second embodiments can be performed without using a sheet.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image processing system comprising:

means for reading image information of an instruction sheet having a first instruction for transferring image data of an electronic document and image data of a paper document to a first terminal as a single mail document and a second instruction for causing a second terminal to create the electronic document and reading the image data of the paper document;

means responsive to the second instruction for causing the second terminal to create the image data of the electronic document; and means responsive to the first instruction for transferring the image data of the paper document and the image data of the electronic document as the single mail document to the first terminal.

2. An image processing system according to claim 1, wherein the means for reading image information of an instruction sheet includes means for reading at least identification information of the instruction sheet, title information of the single mail document, a sender identifier, and a terminal number of the first terminal located on the instruction sheet.

3. An image processing system according to claim 1, wherein the means for causing the second terminal to create the image data of the electronic document corresponding to the second instruction includes means for recognizing identification information of the instruction sheet described on the instruction sheet to execute a program, on the second terminal, to transfer the image data of the electronic document.

4. An image processing system according to claim 1, wherein the means for causing the second terminal to create the image data of the electronic document corresponding to the second instruction includes means for displaying the image data of the paper document on the second terminal when the electronic document is created.

5. An image processing system according to claim 1, wherein the transferring means includes means for transferring the image data of the paper document to the first terminal after the reading means reads the image data of the paper document and before the electronic document is created by the second terminal.

6. An image processing system comprising;

means for inputting a first instruction for transferring image data of an electronic document and image data of a paper document to a first terminal as a single mail document and for inputting a second instruction for allowing a second terminal to create the electronic document;

means responsive to the second instruction for reading the image data of the paper document;

means responsive to the first instruction for allowing the second terminal to create the image data of the electronic document; and means responsive to the first instruction for transferring the image data of the electronic document and the image data of the paper document to the first terminal as the single mail document.

7. An image processing system comprising:

means for creating image data of an electronic document to be transferred using a first terminal;

means for inputting an instruction for transferring the image data of the electronic document and image data of a paper document as a single mail document to a second terminal;

means for printing an instruction sheet on which the instruction is described;

means for reading the instruction sheet and the image data of the paper document; and means for transferring the image data of the paper document and the image data of the electronic document as a single mail document to the second terminal.

8. An image processing system according to claim 7, wherein the inputting means includes means for inputting at least identification information of the instruction sheet, title information of the single mail document, a sender identifier, and a terminal number of the first terminal.

9. An image processing system according to claim 7, wherein the reading means includes means for printing an electronic document created by using the creating means at the first terminal.

10. An image processing system according to claim 7, wherein the transferring means includes means for transferring the image data of the electronic document to the second terminal after the electronic document is created by the first terminal and before the reading means reads the image data of the paper document.

11. An image processing method comprising the steps of:

reading image data of an instruction sheet having a first instruction for transferring image data of an electronic document and image data of a paper document to a first terminal as a single mail document and a second instruction for causing a second terminal to create the electronic document, and reading the image data of the paper document;

causing the second terminal to create the image data of the electronic document; and transferring the image data of the paper document and the image data of the electronic document as the single mail document to the first terminal.

12. An image processing method according to claim 11, wherein the reading step includes reading at least identification information of the instruction sheet, title information of the single mail document, a sender identification, and a terminal number of the first terminal which are described on the instruction sheet.

13. An image processing method according to claim 11, wherein the causing step includes recognizing identification information of the instruction sheet to execute a program, on the second terminal, to transfer the image data of the electronic document.

14. An image processing method according to claim 11, wherein the causing step includes displaying the image data of the paper document on the second terminal when the electronic document is created.

15. An image processing method according to claim 11, wherein the transferring step includes transferring the image data of the paper document to the first terminal after the reading step for reading the image data of the paper document and before the electronic document is created by the second terminal.

16. An image processing method comprising the steps of:

creating image data of an electronic document to be transferred using a first terminal;

inputting an instruction for transferring the image data of the electronic document and image data of a paper document as a single mail document to a second terminal;

printing an instruction sheet on which the instruction is described;

reading the instruction sheet and the image data of the paper document; and transferring the image data of the paper document and the image data of the electronic document as a single mail document to the second terminal.

17. An image processing method according to claim 16, wherein the inputting step includes inputting at least identification information of the instruction sheet, title information of the single mail document, a sender identifier, and a terminal number of the first terminal.

18. An image processing method according to claim 16, wherein the reading step includes the step for printing an electronic document created by using the first terminal by the creating step.

19. An image processing method according to claim 16, wherein the transferring step includes transferring the image data of the electronic document to the second terminal after the creating step for creating the image data of the electronic document and before the reading step for reading the image data of the paper document.

* * * * *